ð
2,865,890

CONDENSATION PRODUCT OF ISOPHTHALIC DIHYDRAZIDE, FORMALDEHYDE AND BUTANOL

Robert W. Auten, Jenkintown, Pa., assignor to Rohm & Haas Company, Philadelphia, Pa., a corporation of Delaware No Drawing. Application January 19, 1956
Serial No. 560,075

1 Claim. (Cl. 260—72.5)

This invention relates to a new kind of nitrogenous resin. It relates to the preparation of resinous, thermosetting, condensation products of an aldehyde and an alcohol with terephthalic or isophthalic hydrazide.

In accordance with this invention, thermosetting resinous products are prepared which, in comparison with conventional amino-resins, are characterized by high flexibility even in the cured or thermoset stage. The resins of this invention retain their flexibility when heated for long periods of time or at high temperatures and consequently are particularly well-suited for use in the preparation of heat-resistant varnishes and enamels.

The products of this invention are made by condensing an aldehyde, preferably formaldehyde, an alcohol, preferably an alkanol of three to twelve carbon atoms, and terephthalic or isophthalic dihydrazide. These dihydrazides are prepared, for example, by the reaction of hydrazine and a diester of terephthalic or isophthalic acid with an alcohol, preferably methyl or ethyl alcohol. Together with the hydrazide there are formed two moles of an alcohol, either methanol or ethanol depending on the ester used. The resins obtained are characterized on the one hand by outstanding hardness and, on the other hand, by a rate of conversion to the insoluble or thermoset form and by a degree of chemical resistance which permit their use in commercial applications. The use of o-phthalic acid is unsuitable because it forms a cyclic hydrazide. Other amino-compounds such as urea, thiourea, melamine and the like are co-condensable with the terephthalic and isophthalic dihydrazides and can be used in small amounts in conjunction with the latter but they detract from the unusual properties contributed by these dihydrazides.

Aldehydes which can be employed include formaldehyde, benzaldehyde, acetaldehyde, butyraldehyde, furfuraldehyde, and mixtures of two or more aldehydes, such as formaldehyde and acetaldehyde, formaldehyde and benzaldehyde, acetaldehyde and furfuraldehyde, and the like. Formaldehyde is the aldehyde of first choice, although very interesting resins result from the use of other aldehydes, especially when used in conjunction with formaldehyde. While the formaldehyde may be used in aqueous solution, as in formalin, under certain conditions, it is preferably used in its polymeric forms; e. g. as paraformaldehyde which yields formaldehyde under the conditions of the condensation reaction.

The ratio of aldehyde to dihydrazide can vary over reasonable limits. Thus, 4 to 8 moles of aldehyde per mole of dihydrazide can be employed, although it is much preferred to use a ratio of 5 to 6 moles per mole of dihydrazide. In this connection it is worthy of note that the dihydrazides are much more reactive than the corresponding amides of the same acids; and they have a "functionality," that is an ability to react with aldehydes, which far exceeds that of amides which ordinarily react with only one mole of aldehyde per amide group, —CONH$_2$.

Alcohols which are reacted with the dihydrazide and aldehyde include those of the aliphatic and araliphatic series, although the much preferred class consists of the alkanols of 3 to 12 and particularly 3 to 8 carbon atoms and which, as the name implies, are unsubstituted and fully saturated. The alkanols can be straight-chained or branch-chained. The following are cited as examples of alcohols which are readily condensed with an aldehyde and the dihydrazide: benzyl, phenylethyl, cyclohexyl, ethyl, n-propyl, isopropyl, n-butyl, sec-butyl, isobutyl, hexyl, octyl, 2-ethylhexyl, dodecyl, allyl, and methallyl alcohols as well as the isomers of the above. Condensates can also be made of the dihydrazides, aldehydes, and hydroxylated compounds in general, such as polyhydric alcohols including ethylene glycol and diethylene glycol, 1,6-hexandiol, glycerol, pentaerythritol, sorbitol, mannitol, carbohydrates in general, alkyd resins having free hydroxyl groups, and castor oil.

The amount of alcohol which is employed in making the resins of this invention may vary over wide limits because the alcohol not only reacts by etherification with the alkylol groups of the dihydrazide-aldehyde condensate but also serves as a solvent for the reaction mixture and for the product. As much as a hundred moles of the alcohol can be present per mole of dihydrazide, but there appears to be no advantage in employing such excessive amounts; and a maximum ratio of about 15 moles of alcohol per mole of dihydrazide is recommended. The important consideration is that sufficient alcohol react so as to impart to the resin solubility in hydrocarbon solvents such as toluene and xylene or in mixtures of alcohols and hydrocarbon solvents. It is well-known that amino-resins become more soluble in hydrocarbons and cure more slowly to softer films as the size of the alcohol which is reacted therewith by etherification increases. Thus, for example, resins made from octyl alcohol are more soluble in hydrocarbons, oils, etc. and cure more slowly to softer films than do resins made from butanol, all other factors being equal. In the case of these dihydrazides, however, there is more involved, due to the unique structure of the dihydrazides which contain an arylene link between the two reactive terminal groupings. It is this hydrocarbon link which is now believed to impart hardness to the resins.

The dihydrazide resins of this invention can be prepared by various procedures. Thus, for example, the alcohol, aldehyde and dihydrazide can be mixed and heated together until the desired end point is reached. This method is particularly suitable when the lower alcohol; e. g. isopropyl or butyl alcohols, is employed with an excess of alcohol present as solvent. Alternatively, the dihydrazide and aldehyde can first be condensed alone and then reacted with the alcohol. In any case, it appears that, in the first stage of reaction, the aldehyde and dihydrazide condense to form compounds containing alkylol groups and that the alcohol then reacts by etherification with these alkylol groups. It is advisable to prepare the reaction products of the higher alcohols; e. g. octyl and lauryl alcohols, by a process of transetherification. In this procedure, the condensate of the dihydrazide, aldehyde and a lower alcohol such as butanol is first prepared and this condensate is then heated with the higher alcohol. Transetherification occurs on heating and the radical of the higher alcohol replaces the radical of the lower alcohol in the condensate and the latter is liberated as free alcohol which can be readily recovered and reused. As the etherification progresses by reaction of the alcohol with the condensate, the product becomes increasingly soluble in hydrocarbon solvents such as toluene and xylene and also becomes increasingly compatible with such materials as oils, varnishes, alkyd resins and the like.

The reaction of the dihydrazide, aldehyde and alcohol is ordinarily conducted at a temperature between about 80° C. and the refluxing temperature of the reaction mixture at atmospheric pressure. Temperatures above the refluxing temperature can be used together with the application of pressure.

The pH of the reaction mixture is an important factor in the rate at which condensation takes place. Condensation proceeds more rapidly at the lower pH's. Ordinarily the pH of the reaction mixture is lowered as the reaction progresses. Although the reaction may be carried out at a pH of 7.0, or even slightly on the alkaline side, it is desirable to operate under acidic conditions at pH's between 1.0 and 7.0. A particularly recommended range of pH is from 2.0 to 6.0.

An organic solvent, particularly a hydrocarbon solvent such as toluene or xylene, may be present during the condensation reaction. Alternatively, it may be added after the condensation and serve as a solvent for the resinous product.

In the application of the resinous condensate solutions, a small proportion of an acid catalyst may be added to accelerate the cure during baking, such as from 0.1 to 1.5% of the acid catalyst based on the weight of condensate. Examples of the catalysts that may be used include any alkyl acid phthalate, such as butyl acid phthalate, p-toluenesulfonic acid, and so on.

Example 1

A mixture of 99 grams (equivalent to 3 moles of formaldehyde) of paraformaldehyde, 20 grams of xylene, 370 grams (5 moles) of n-butanol was refluxed for fifteen minutes at pH 7.6 in a glass reaction vessel equipped with stirrer, thermometer, and condenser fitted through a water separator. The resulting solution was allowed to cool slightly, and 97 grams (0.5 mole) of terephthalic dihydrazide was added. The mixture was refluxed for one and one-quarter hours at 106° to 115° C. during which time 25 ml. of water was separated and all the dihydrazide had dissolved. Enough 50% formic acid was added to adjust the pH to 3.8. The reaction mixture was refluxed for four and three-quarter hours until no more water separated; a total of 33 ml. of water was removed. After addition of 100 grams of butanol, 190 ml. of solvent was removed by distillation. The reaction mixture was then stripped at reduced pressure (water pump) to a viscosity of P and filtered through Supercel; a little butanol was used to rinse. There was obtained 294.4 grams of resin solution with a Gardner-Holdt viscosity of I at 48.6% solids and a color of 5 on the paint-varnish scale.

Films of the resin solution (to which was added 1% of butyl acid phthalate) coated on panels of metal and glass and baked at 150° C. for half an hour were hard and glossy. More flexible coating films are obtained from a mixture of the resin solution with a non-oxidizing phthalic alkyd in resin solids ratio of 30:70 parts by weight containing 1% of butyl acid phthalate after baking at 150° C. for half an hour.

Example 2

A similar procedure was followed with 66 grams (2 moles HCHO) of paraformaldehyde, 20 grams of xylene, 259.0 grams (3.5 moles) of n-butanol, and 97.0 grams (0.5 mole) of terephthalic dihydrazide. A total of 32 ml. of water was removed. There was obtained 268.6 grams of resin solution with a Gardner-Holdt viscosity of L at 44.1% solids and a color of 11+ on the paint-varnish scale.

Coatings similar to those obtained in Example 1 are prepared from the resin solution containing 1% of butyl acid phthalate and also from a 30:70 (solids) mixture of the resin solution and a simple phthalic alkyd containing 1% of butyl acid phthalate, after baking half an hour at 150° C. in each case.

Example 3

(a) A mixture of 99 grams (3 moles HCHO) of paraformaldehyde, 370 grams (5 moles) of n-butanol, and 20 grams of xylene was refluxed at pH 9.0 in a glass reaction vessel equipped with stirrer, thermometer, and condenser fitted through a water separator. When all the paraform had dissolved, 97 grams (0.5 mole) of isophthalic dihydrazide was added. The reaction mixture was heated at pH 9.0 and 103° to 107° C. for thirty-five minutes during which time 13 ml. of water separated. Formic acid was added to adjust the pH to 3.8 and the mixture was heated at 107° to 109° C. for twenty-three minutes during which time an additional 6 ml. of water separated. Then 100 ml. of xylene was added and solvent was stripped off at water pump pressure to leave 325.8 grams of a butanol-xylene solution of isophthalic dihydrazide-formaldehyde-butanol coating resin with a viscosity of N at 33.5% solids and a color of 1.

(b) A similar procedure was followed with 99 grams (3 moles HCHO) of paraformaldehyde, 370 grams (5 moles) of butanol, 97 grams (0.5 mole) of isophthalic dihydrazide, and 20 grams of xylene. The mixture was heated for one and one-half hours at 105° to 109° C. and pH 8.0; 12 ml. of water separated. Then the mixture was acidified to pH 3.8 with formic acid and heated at 109° to 118° C. for two and three-quarters hours. An additional 13 ml. of water separated. After addition of xylene the mixture was stripped to 310.2 grams of resin solution with a viscosity of X at 56.7% solids and a color of 4.

(c) The resin solutions, after addition of 1% butyl acid phthalate, were coated on metal and glass panels and baked at 205° C. for 15 minutes. Each of the resin solutions was mixed with an epoxy resin obtained from the condensation of epichlorohydrin with methylene bisphenol in the resin solids ratio of 20:80 parts by weight, and after addition of 1% of butyl acid phthalate, they were coated on metal panels and baked at 205° C. for 15 minutes to produce flexible coatings thereon. The resin solutions of parts (a) and (b) hereof were also mixed with a butanol-modified urea-formaldehyde condensate in the resin solids ratio 30:70 parts by weight and, after addition of 1% butyl acid phthalate, films were coated on metal and glass panels and baked at 205° C. for 15 minutes to form a hard, glossy finish.

It is to be understood that changes and variations may be made without departing from the spirit and scope of the invention as defined in the appended claim.

I claim:

A composition of matter comprising a thermosetting resinous condensation product of a mixture of (a) isophthalic dihydrazide, (b) butanol in an amount of about 7 to 15 moles per mole of dihydrazide, and (c) formaldehyde in an amount from 4 to 8 moles per mole of dihydrazide, sufficient of the butanol being combined to render the condensation product soluble in a solvent selected from the group consisting of toluene, xylene, mixtures thereof, and mixtures thereof with alcohols, said product being that obtained by heating the mixture at a pH of 1 to 7 and a temperature of 80° C. to reflux.

References Cited in the file of this patent

UNITED STATES PATENTS

| | | |
|---|---|---|
| 2,509,183 | Auten | May 23, 1950 |
| 2,597,467 | Fisher et al. | May 20, 1952 |
| 2,668,154 | Orth | Feb. 2, 1954 |